(12) United States Patent
Xiao et al.

(10) Patent No.: US 9,269,349 B2
(45) Date of Patent: Feb. 23, 2016

(54) AUTOMATIC METHODS TO PREDICT ERROR RATES AND DETECT PERFORMANCE DEGRADATION

(75) Inventors: Xiaoqiang Xiao, Arlington, MA (US); Venkatesh Nagesha, Wayland, MA (US)

(73) Assignee: Nuance Communications, Inc., Burlington, MA (US)

( * ) Notice: Subject to any disclaimer, the term of this patent is extended or adjusted under 35 U.S.C. 154(b) by 451 days.

(21) Appl. No.: 13/479,945

(22) Filed: May 24, 2012

(65) Prior Publication Data

US 2013/0317820 A1 Nov. 28, 2013

(51) Int. Cl.
*G10L 15/06* (2013.01)
*G10L 15/01* (2013.01)
*G10L 15/065* (2013.01)

(52) U.S. Cl.
CPC .............. *G10L 15/01* (2013.01); *G10L 15/065* (2013.01)

(58) Field of Classification Search
CPC ................................ G10L 15/01; G10L 15/00
USPC .......................................... 704/251, 236, 231
See application file for complete search history.

(56) References Cited

U.S. PATENT DOCUMENTS

| | | | |
|---|---|---|---|
| 5,566,272 A * | 10/1996 | Brems ...................... | G10L 15/22 704/231 |
| 5,737,489 A * | 4/1998 | Chou ..................... | G10L 15/063 704/232 |
| 5,794,189 A | 8/1998 | Gould | |
| 6,167,377 A | 12/2000 | Gillick et al. | |
| 6,263,308 B1 * | 7/2001 | Heckerman et al. .......... | 704/231 |
| 7,149,687 B1 * | 12/2006 | Gorin et al. ................... | 704/243 |
| 7,440,895 B1 * | 10/2008 | Miller ..................... | G10L 15/01 704/231 |
| 7,668,710 B2 * | 2/2010 | Doyle ............... | 704/9 |
| 7,895,039 B2 * | 2/2011 | Braho et al. ................... | 704/251 |
| 8,606,575 B1 * | 12/2013 | Witt-ehsani ................. | 704/235 |
| 2002/0049593 A1 * | 4/2002 | Shao ...................... | G10L 15/14 704/251 |
| 2002/0133341 A1 * | 9/2002 | Gillick et al. ................ | 704/235 |
| 2003/0125945 A1 * | 7/2003 | Doyle ..................... | G10L 15/01 704/246 |
| 2003/0182121 A1 * | 9/2003 | Hwang ................. | G10L 15/063 704/251 |
| 2004/0015350 A1 * | 1/2004 | Gandhi et al. ............... | 704/235 |
| 2006/0149544 A1 * | 7/2006 | Hakkani-Tur et al. ........ | 704/236 |
| 2007/0005354 A1 * | 1/2007 | Potter et al. .................. | 704/231 |
| 2007/0192095 A1 * | 8/2007 | Braho et al. ................. | 704/232 |
| 2008/0114595 A1 * | 5/2008 | Vair ........................ | G10L 15/08 704/236 |
| 2009/0030692 A1 * | 1/2009 | Deligne et al. ................ | 704/257 |
| 2010/0268536 A1 * | 10/2010 | Suendermann ....... | G10L 15/063 704/243 |

(Continued)

OTHER PUBLICATIONS

Seivert Entwistle, Marcia. "The performance of automated speech recognition systems under adverse conditions of human exertion." International journal of Human-computer interaction 16.2 (2003): 127-140.*

(Continued)

*Primary Examiner* — Brian Albertalli
(74) *Attorney, Agent, or Firm* — Banner & Witcoff, Ltd.

(57) ABSTRACT

An automatic speech recognition dictation application is described that includes a dictation module for performing automatic speech recognition in a dictation session with a speaker user to determine representative text corresponding to input speech from the speaker user. A post-processing module develops a session level metric correlated to verbatim recognition error rate of the dictation session, and determines if recognition performance degraded during the dictation session based on a comparison of the session metric to a baseline metric.

20 Claims, 3 Drawing Sheets

(56) References Cited

U.S. PATENT DOCUMENTS

| | | | | |
|---|---|---|---|---|
| 2010/0292545 | A1* | 11/2010 | Berka et al. | 600/301 |
| 2011/0144986 | A1* | 6/2011 | Yu | G10L 15/01 704/232 |
| 2013/0262110 | A1* | 10/2013 | Xie | G10L 15/183 704/235 |
| 2014/0288932 | A1* | 9/2014 | Yeracaris | G10L 15/32 704/249 |

OTHER PUBLICATIONS

Frankish, Clive, Dylan Jones, and Kevin Hapeshi. "Decline in accuracy of automatic speech recognition as a function of time on task: fatigue or voice drift?." International Journal of Man-Machine Studies 36.6 (1992): 797-816.*

Caraty, Marie-José, and Claude Montacié. "Vocal fatigue induced by prolonged oral reading: Analysis and detection." Computer Speech & Language 28.2 (2014): 453-466.*

Anastasakos, Tasos, and Sreeram V. Balakrishnan. "The use of confidence measures in unsupervised adaptation of speech recognizers." ICSLP. 1998.*

Novotney, Scott, Richard Schwartz, and Jeff Ma. "Unsupervised acoustic and language model training with small amounts of labelled data." Acoustics, Speech and Signal Processing, 2009. ICASSP 2009. IEEE International Conference on. IEEE, 2009.*

Gollan, Christian, and Michiel Bacchiani. "Confidence scores for acoustic model adaptation." Acoustics, Speech and Signal Processing, 2008. ICASSP 2008. IEEE International Conference on. IEEE, 2008.*

Ma, Jeff, et al. "Unsupervised training on large amounts of broadcast news data." Acoustics, Speech and Signal Processing, 2006. ICASSP 2006 Proceedings. 2006 IEEE International Conference on. vol. 3. IEEE, 2006.*

Riccardi, Giuseppe, and Dilek Hakkani-Tür. "Active learning: Theory and applications to automatic speech recognition." Speech and Audio Processing, IEEE Transactions on 13.4 (2005): 504-511.*

Wessel, Frank, and Hermann Ney. "Unsupervised training of acoustic models for large vocabulary continuous speech recognition." Speech and Audio Processing, IEEE Transactions on 13.1 (2005): 23-31.*

Tur, Gokhan, Dilek Hakkani-Tür, and Giuseppe Riccardi. "Extending boosting for call classification using word confusion networks." Acoustics, Speech, and Signal Processing, 2004. Proceedings. (ICASSP'04). IEEE International Conference on. vol. 1. IEEE, 2004.*

Wang, Dagen, and Shrikanth S. Narayanan. "A confidence-score based unsupervised MAP adaptation for speech recognition." Signals, Systems and Computers, 2002. Conference Record of the Thirty-Sixth Asilomar Conference on. vol. 1. IEEE, 2002.*

Riccardi, Giuseppe, and Dilek Z. Hakkani-Tür. "Active and unsupervised learning for automatic speech recognition." Interspeech. 2003.*

Gillick et al., A Probabilistic Approach to Confidence Estimation and Evaluation, Dragon Systems, Inc., Newton, MA, 1997.

* cited by examiner

AUTOMATIC METHODS TO PREDICT ERROR RATES AND DETECT PERFORMANCE DEGRADATION

TECHNICAL FIELD

The present invention relates to confidence scores in automatic speech recognition dictation applications.

BACKGROUND ART

An automatic speech recognition (ASR) system determines a semantic meaning of input speech. Typically, the input speech is processed into a sequence of digital speech feature frames. Each speech feature frame can be thought of as a multi-dimensional vector that represents various characteristics of the speech signal present during a short time window of the speech. In a continuous recognition system, variable numbers of speech frames are organized as "utterances" representing a period of speech followed by a pause, which in real life loosely corresponds to a spoken sentence or phrase.

The ASR system compares the input speech frames to a database of statistical models to find the models that best match the speech feature characteristics and determine a corresponding representative text or semantic meaning associated with the models. Modern statistical models are state sequence models such as hidden Markov models (HMMs) that model speech sounds (usually phonemes) using mixtures of Gaussian distributions. Often these statistical models represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the statistical models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Confidence scores can be used to characterize the degree of correspondence between a given model sequence and the speech input. FIG. 1 shows a scale of confidence scores along a vertical axis ranging from a high of 1000 to a low of 0. Typically, speech recognition outputs having a confidence score above a given accept threshold are automatically accepted as probably correctly recognized. And speech recognition outputs having a confidence score below a given reject threshold are automatically rejected as probably not correctly recognized. Speech recognition outputs between the two confidence score thresholds may or may not be correctly recognized and usually require some form of user confirmation.

Confidence scores are widely used in automated dialog systems, but to date their use in dictation tasks has been rather limited. At present, confidence scoring in dictation applications has been confined to identifying incorrectly recognized words or in multi-pass recognition.

SUMMARY

Embodiments of the present invention are directed to an application and corresponding method for automatic speech recognition dictation. A dictation module performs automatic speech recognition in a dictation session with a speaker user to determine representative text corresponding to input speech from the speaker user. A post-processing module develops a session level metric correlated to verbatim recognition error rate of the dictation session, and determines if recognition performance degraded during the dictation session based on a comparison of the session metric to a baseline metric.

In specific embodiments operation of the post-processing module further includes warning the speaker user when degraded recognition performance is determined to have occurred and providing a recommended action to the speaker user for responding to the degraded recognition performance. For example, the recommended action may include checking an audio input signal containing the input speech and/or manually verifying the representative text results. The session-level metric may include a word-level confidence metric based on a word confidence model using logistic regression. And the baseline metric may represent performance of a previous version of the automatic speech recognition dictation application. The post-processor module may operate on-line in real-time with the dictation module, or off-line from the dictation module.

DETAILED DESCRIPTION

Various embodiments of the present invention are directed to automatically providing timely feedback to speaker users of an ASR dictation application when system accuracy degrades and then suggest and/or initiate corrective action. Human generated transcriptions are not needed.

For example, the developers of an ASR dictation application regularly improve, adjust, adapt, and change different elements of the system to improve its performance. Such changes are implemented in deployed versions of the application when the developers believe that a significant number of users will benefit. But though the users as a whole may generally benefit from a given change, there will be specific individual users for whom the changes are not beneficial and who may even experience worse performance by the system after a change has been made. Clearly such users would have been better off without receiving such changes and revisions. Embodiments of the present invention allow developers to identify such users for whom a given specific system revision should not be implemented. For example, when a new set of recognition models have been developed, embodiments of the present invention identify users for whom the old models are qualitatively better and who therefore should not receive the new models. Such decision making can be done automatically without requiring user involvement.

Besides such off-line developer applications, embodiments of the present invention can also be useful for end users engaged in on-line real time dictation sessions. For example, a given user may have a significant history of using a dictation application. During this period, a stable and reliable confidence score baseline develops for that user. Then, during the last 10 minutes of a dictation session, something unusual happens—microphone degrades or moves, traffic noise increases, etc.—and as a result, the confidence scores become much worse than the established baseline. Embodiments of the present invention are able to provide timely feedback to the user and recommend and/or initiate corrective action.

Ideally, verbatim error rate would be used, but that cannot be automated since it requires human intervention to determine truth transcriptions. However, the ASR system typically generates a word-level confidence metric during recognition, and a post processing module can integrate confidence into a session-level metric. We have found that such a session metric is highly correlated to verbatim error rates and can be compared to a baseline metric to decide if recognition performance has degraded unacceptably.

Figure 1:
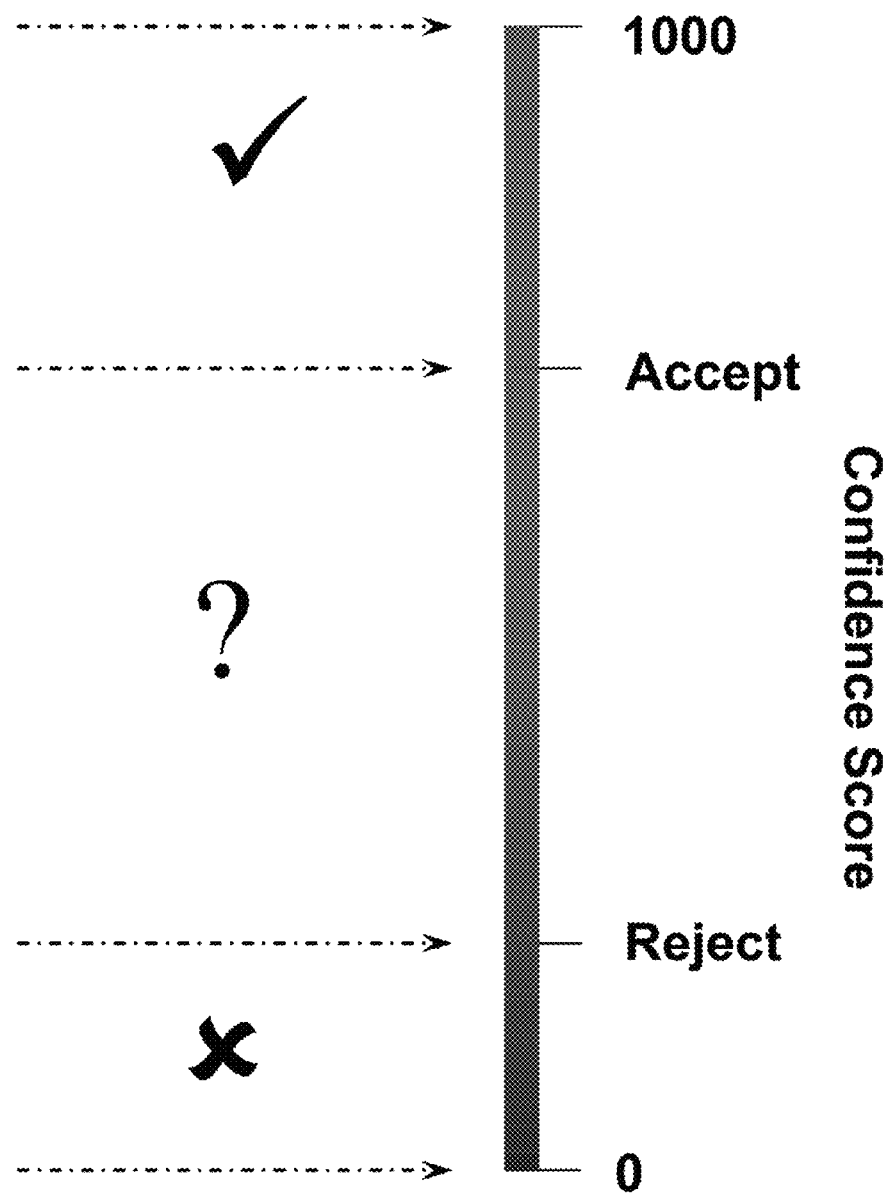
FIG. 1 shows a typical confidence score scale arrangement for use in a speech recognition engine.
Figure 2:
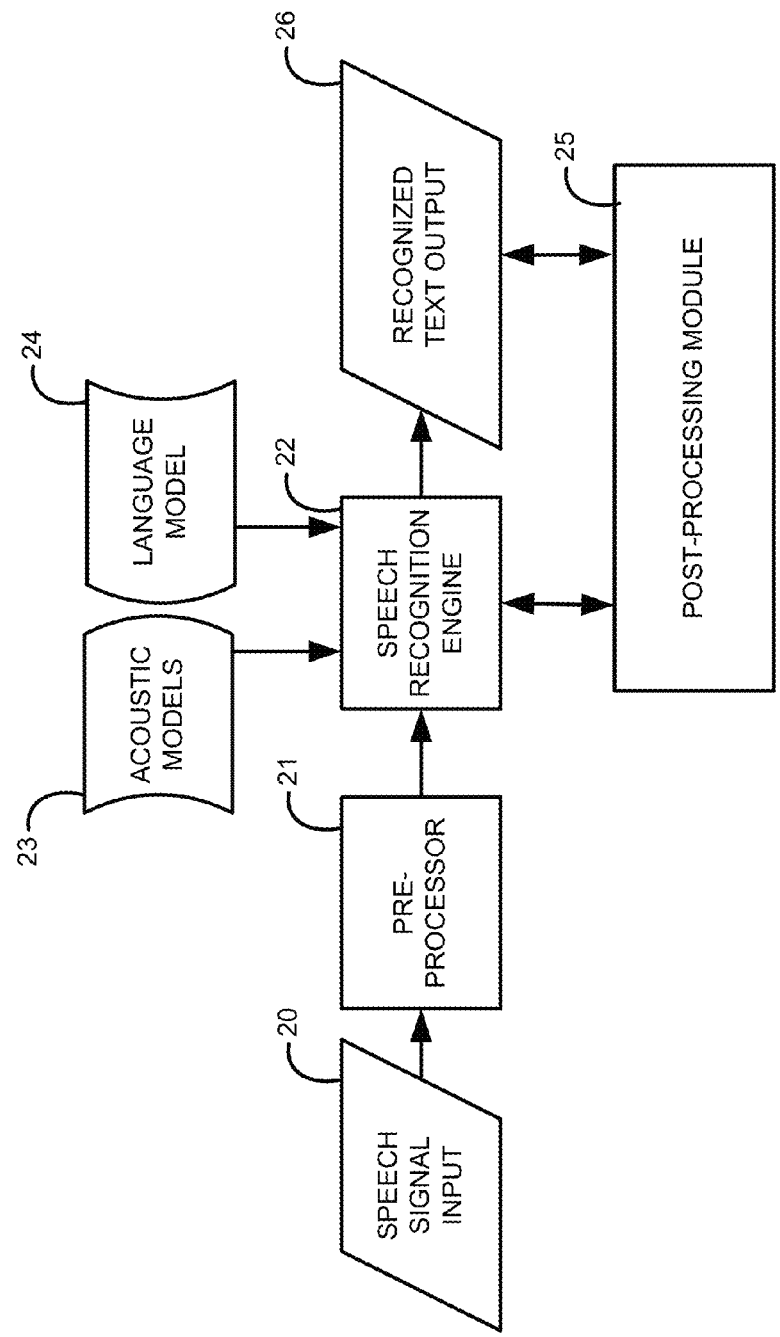
FIG. 2 shows various functional blocks in a speech recognition engine having a post-processing module according to an embodiment of the present invention.
Figure 3:
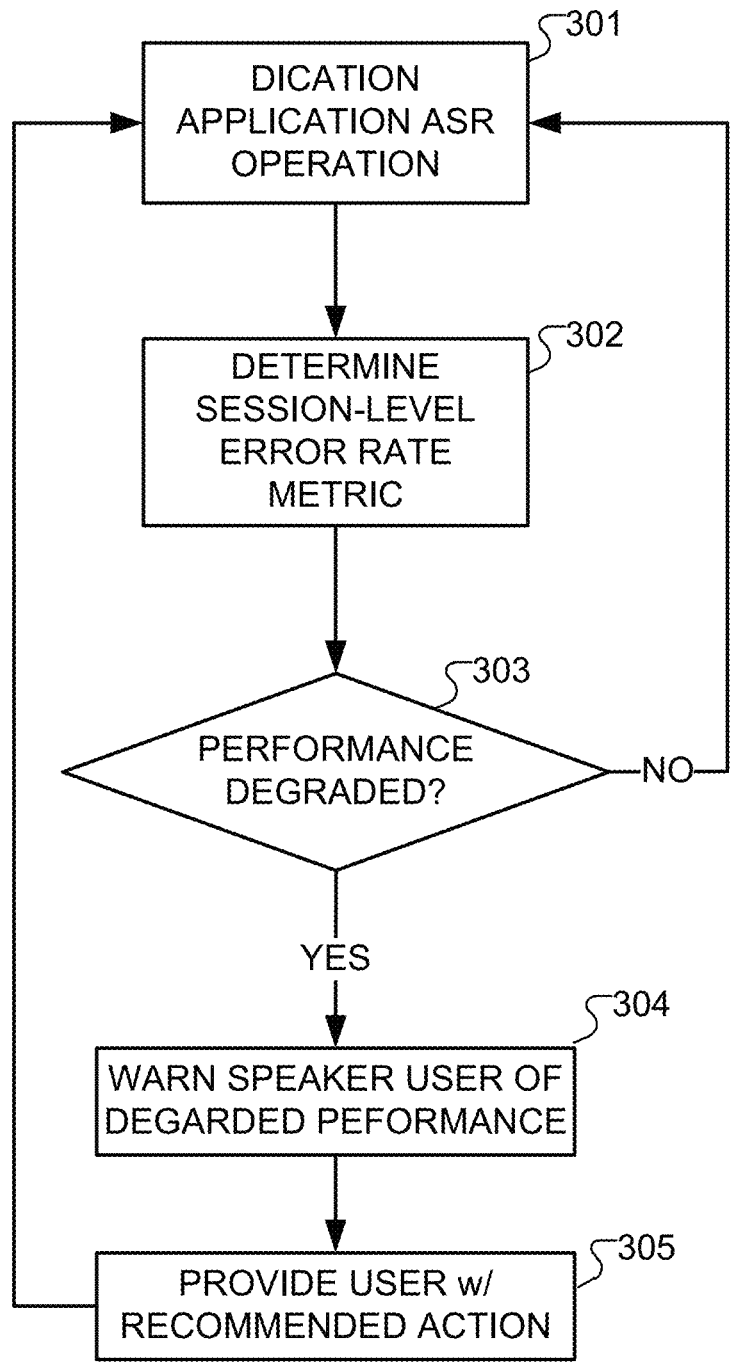
FIG. 3 shows various steps in automatic adjustment of confidence scoring according to an embodiment of the present invention.

FIG. 2 shows various functional blocks in an automatic speech recognition dictation application which benefits from an embodiment of the present invention. FIG. 3 shows various logical steps according to one specific embodiment. Initially, the ASR dictation application performs automatic speech recognition that determines representative text corresponding to input speech, step 301. More specifically, speech signal input module 20 receives a speech input from a user and converts it into a representative electrical signal. For example, this may be based on the use of a conventional microphone. Pre-processor 21 is a computer process on at least one hardware implemented processor that initially converts the speech input signal into a sequence of digital speech frames. The speech recognition engine 22 is a set of computer processes on at least one hardware implemented processor that compare the sequence of speech frames to various acoustic models 23 and a language model 24 to determine a representative recognized text output 26 that corresponds to the speech input.

Operation of the dictation application also involves a post-processing module 25 that monitors the operation of the speech recognition engine 22 and the recognized text output 26 to develop a session level metric that is correlated to verbatim recognition error rate of the dictation session, step 302. For example, a session level metric may specifically be a word-level confidence metric based on a word confidence model using logistic regression. That is, it is impractical to directly compare the word error rates (WERs) between two ASR systems because that would require a costly and time consuming manual transcription process. But it turns out that a session metric based on average word confidence correlates well with WER:

$$\text{Accuracy} \approx \frac{E[\# \text{ correct}]}{\# \text{ words}} = \frac{\sum_i P_i}{\# \text{ words}} = avg(P_i)$$

where $P_i$ represents the confidence score of word i, $E[\#\text{correct}]$ represents the expectation of number of correct words, and #words represents number of words. In one embodiment, the word confidence model is based on a logistic regression on 55 features including AM/LM scores, etc. See e.g., Gillick, Ito, and Young, *A Probabilistic Approach to Confidence Esti-* *mation and Evaluation*, Proc. International Conference on Acoustics, Speech and Signal Processing, 1997; incorporated herein by reference.

Thus, the post-processing module can test (e.g., for a new user profile) some hypothesis H0 that the new system-A is no worse than the original system-B:

$WER[A]-WER[B]<\eta$ by a proxy session metric based average word confidence:

if $avg_A[\text{word confidence}]-avg_B[\text{word confidence}] \leq \gamma$, then reject $H0$ But the challenge here is that as AM/LM updates in the user profile, the scale of features in the word confidence model would change, so if using the same pretrained confidence model the word confidence for A and B cannot be compared directly. Instead, this can be approximated by calibrating the word confidence model with a small labeled data set using posterior probability.

Based on a comparison of the session metric to a baseline metric, the post-processing module 25 can determine whether or not recognition performance has degraded beyond some threshold value, step 303. If not (i.e., accuracy is acceptable), then the dictation application is ready for the next dictation session with the speaker user, step 301. But when the post-processor module 25 does determine that recognition performance has degraded significantly, step 303, the speaker user can be warned, step 304, and provided with a recommended corrective action, step 305. Examples of a recommended corrective action include, without limitation, checking an audio input signal containing the input speech (that is, checking the user microphone signal) and/or manually verifying the representative text results Such an arrangement may be of interest in multiple different situations. The developer of a new upgrade version of an ASR dictation application (e.g., a new user profile) can check if system recognition accuracy using the new upgrade version is better or worse than previous baseline version of the application. In another scenario, recognition accuracy of an ASR dictation application can be monitored during normal operation with a given speaker user, and when degraded recognition performance occurs, the speaker user can be warned and provided with a recommended action; for example, checking an audio input signal containing the input speech and/or manually verifying the representative text results.

Embodiments of the invention may be implemented in whole or in part in any conventional computer programming language such as VHDL, SystemC, Verilog, ASM, etc. For example, a pseudo code representation of such a process might be set forth as follows:

```
Process perf_degrad
    for session_metric - base_metric < thresh
        warn perf_degrad
        call recommend_action
```

Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method comprising:
generating, by a computing system and utilizing a set of speech-recognition models, text corresponding to input speech spoken by a user during a first dictation session;
determining, by the computing system, based on the text corresponding to the input speech spoken by the user during the first dictation session, and without comparing the text corresponding to the input speech spoken by the user during the first dictation session to preexisting text corresponding to the input speech spoken by the user during the first dictation session, a metric correlated to a verbatim-recognition error rate of the first dictation session;
generating, by the computing system and utilizing an updated set of speech-recognition models, text corresponding to input speech spoken by the user during a second dictation session;
determining, by the computing system, based on the text corresponding to the input speech spoken by the user during the second dictation session, and without comparing the text corresponding to the input speech spoken by the user during the second dictation session to preexisting text corresponding to the input speech spoken by the user during the second dictation session, a metric correlated to a verbatim-recognition error rate of the second dictation session; and
comparing, by the computing system, the metric correlated to the verbatim-recognition error rate of the first dictation session with the metric correlated to the verbatim-recognition error rate of the second dictation session to determine if recognition performance degraded for the user during the second dictation session due to utilization of the updated set of speech-recognition models.

2. The computer-implemented method of claim 1, wherein determining the metric correlated to the verbatim-recognition error rate of the first dictation session comprises determining a word-level confidence metric for the first dictation session, and wherein determining the metric correlated to the verbatim-recognition error rate of the second dictation session comprises determining a word-level confidence metric for the second dictation session.

3. The computer-implemented method of claim 2, wherein determining the word-level confidence metric for the first dictation session comprises determining, using a logistic regression model, an average word confidence for the first dictation session, and wherein determining the word-level confidence metric for the second dictation session comprises determining, using the logistic regression model, an average word confidence for the second dictation session.

4. The computer-implemented method of claim 3, wherein determining the average word confidence for the first dictation session comprises, determining, for each of a plurality of features, a logistic regression for the first dictation session, and wherein determining the average word confidence for the second dictation session comprises, determining, for each of the plurality of features, a logistic regression for the second dictation session.

5. The computer-implemented method of claim 4, wherein:
determining the average word confidence for the first dictation session comprises:
determining a plurality of acoustic-model scores for the first dictation session;
determining a plurality of language-model scores for the first dictation session;
determining a logistic regression of the plurality of acoustic-model scores for the first dictation session; and
determining a logistic regression of the plurality of language-model scores for the first dictation session; and
determining the average word confidence for the second dictation session comprises:
determining a plurality of acoustic-model scores for the second dictation session;
determining a plurality of language-model scores for the second dictation session;
determining a logistic regression of the plurality of acoustic-model scores for the second dictation session; and
determining a logistic regression of the plurality of language-model scores for the second dictation session.

6. The computer-implemented method of claim 3, comprising calibrating, after determining the average word confidence for the first dictation session, before determining the average word confidence for the second dictation session, and based on a dataset associated with the user and a posterior probability associated with the user, the logistic regression model.

7. A system comprising:
at least one processor; and
a memory storing instructions that when executed by the at least one processor cause the system to:
determine metrics correlated to verbatim-recognition error rates of distinct dictation sessions without comparing text generated by the system, using differing sets of speech-recognition models, for input speech spoken by a user during the distinct dictation sessions to preexisting text corresponding to the input speech; and
compare one or more metrics of the metrics with one or more other metrics of the metrics to determine whether recognition performance degraded for the user between one or more of the distinct dictation sessions due to utilization of one or more of the differing sets of speech-recognition models.

8. The system of claim 7, wherein the instructions, when executed by the at least one processor, cause the system to determine, for each of the distinct dictation sessions, a word-level confidence metric.

9. The system of claim 7, wherein the instructions, when executed by the at least one processor, cause the system to determine, for each of the distinct dictation sessions and based on a logistic regression model, an average word confidence.

10. The system of claim 9, wherein the instructions, when executed by the at least one processor, cause the system to calibrate, between the distinct dictation sessions and based on a dataset associated with the user and a posterior probability associated with the user, the logistic regression model.

11. The system of claim 7, wherein the instructions, when executed by the at least one processor, cause the system to determine, for each dictation session of the distinct dictation sessions, a logistic regression of each of a plurality of features of the dictation session.

12. The system of claim 7, wherein the instructions, when executed by the at least one processor, cause the system to determine, for each of the distinct dictation sessions, a plurality of acoustic-model scores, a plurality of language-model scores, a logistic regression of the plurality of acoustic-model scores, and a logistic regression of the plurality of language-model scores.

13. The system of claim 7, wherein the instructions, when executed by the at least one processor, cause the system to:
   determine a difference between the metrics; and
   compare the difference to a predetermined threshold.

14. One or more non-transitory computer-readable media having instructions stored thereon that when executed by one or more computers cause the one or more computers to compare, against one another, metrics, correlated to verbatim-recognition error rates of distinct dictation sessions, determined by the one or more computers without comparing text generated by the one or more computers, using differing sets of speech-recognition models, for input speech spoken by a user during the distinct dictation sessions to preexisting text corresponding to the input speech, to determine whether recognition performance degraded for the user between one or more of the distinct dictation sessions due to utilization of one or more of the differing sets of speech-recognition models.

15. The one or more non-transitory computer-readable media of claim 14, wherein the instructions, when executed by the one or more computers, cause the one or more computers to determine, for each of the distinct dictation sessions, a word-level confidence metric.

16. The one or more non-transitory computer-readable media of claim 14, wherein the instructions, when executed by the one or more computers, cause the one or more computers to determine, for each of the distinct dictation sessions and based on a logistic regression model, an average word confidence.

17. The one or more non-transitory computer-readable media of claim 16, wherein the instructions, when executed by the one or more computers, cause the one or more computers to calibrate, between the distinct dictation sessions and based on a dataset associated with the user and a posterior probability associated with the user, the logistic regression model.

18. The one or more non-transitory computer-readable media of claim 14, wherein the instructions, when executed by the one or more computers, cause the one or more computers to determine, for each dictation session of the distinct dictation sessions, a logistic regression of each of a plurality of features of the dictation session.

19. The one or more non-transitory computer-readable media of claim 14, wherein the instructions, when executed by the one or more computers, cause the one or more computers to determine, for each of the distinct dictation sessions, a plurality of acoustic-model scores, a plurality of language-model scores, a logistic regression of the plurality of acoustic-model scores, and a logistic regression of the plurality of language-model scores.

20. The one or more non-transitory computer-readable media of claim 14, wherein the instructions, when executed by the one or more computers, cause the one or more computers to:
   determine a difference between the metrics; and
   compare the difference to a predetermined threshold.

* * * * *